April 3, 1962  E. E. BEER  3,028,083
ROTARY MOTION STORAGE MECHANISM
Filed July 20, 1961  3 Sheets-Sheet 1

INVENTOR.
EMANUEL E. BEER

BY H. I. Mackey

ATTORNEY.

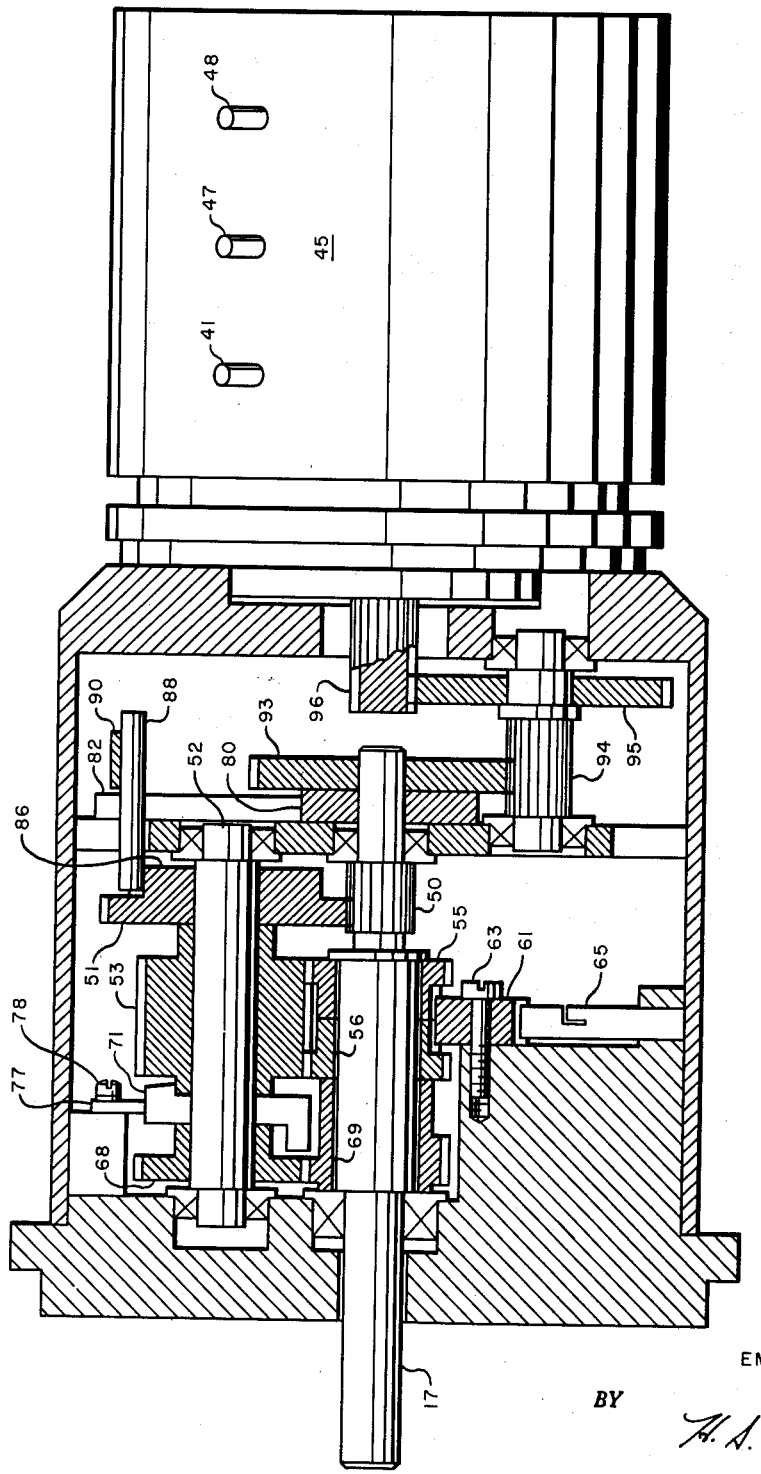

United States Patent Office 3,028,083
Patented Apr. 3, 1962

3,028,083
ROTARY MOTION STORAGE MECHANISM
Emanuel E. Beer, White Plains, N.Y., assignor to General Precision, Inc., a corporation of Delaware
Filed July 20, 1961, Ser. No. 125,472
7 Claims. (Cl. 235—91)

This invention relates to apparatus for temporarily storing rotary motion and more specifically to a mechanical device for receiving and storing a finite maximum amount of angular displacement and for subsequently providing an output having an angular displacement equal to the angular displacement received.

It is very often desirable or necessary to perform a totalizing operation by the use of counters or other devices and the counters available are both precise and reliable. However, in many applications the input to the counting device may be in error, thus requiring periodic correction of the total whenever more accurate information is available. This is particularly true in the field of air navigation where a counting device is utilized to record and keep track of distance traveled. Unfortunately the input to the counter is subject to error. These accumulated errors are corrected at check points by readjusting the counter to a known and independently determined count.

Before the counter can be adjusted it must be disconnected from the input and means must be provided to record or store the input during adjustment of the counter so that the input information will not be lost. An additional counter could perform this function quite well but at a cost which would be prohibitive in this type of application.

One object of this invention is to provide a mechanical storage unit for storing angular displacement and for delivering the exact displacement at a later time.

Another object of this invention is to provide a mechanical storage unit for storing angular displacement and for delivering the exact displacement at a later time which is inexpensive to manufacture, has long life, and is reliable in operation.

Yet another object is to provide a storage unit which will run indefinitely without locking up or destroying itself in the event of reversal failure.

The invention contemplates a storage unit having an input shaft with a single pinion drivingly connected thereto, a counter shaft driven by a gear meshing with said pinion, a second pinion drivingly mounted on said counter shaft, first and second dissimilar gears mounted for free rotation and arranged to engage and be driven by said second pinion, means engaging said two dissimilar gears for positionally indicating the direction of rotation of said gears when the input shaft is rotated, a third pinion drivingly mounted for rotation with said counter shaft, a third gear mounted for free rotation and arranged to engage and be driven by said third pinion, means mounted for rotation with said third gear, displaceable means for indicating a predetermined number of rotations of said input shaft, and movable means rotated by said counter shaft for simultaneously engaging said means mounted for rotation on the third gear and the movable indicating means after a predetermined number of input shaft rotations to move said indicating means to an alternate position for indicating a predetermined number of input shaft rotations.

The foregoing and other objects and advantages of the invention will appear more clearly from a consideration of the specification and drawings wherein one embodiment of the invention is described and shown in detail for illustration purposes only.

In the drawings:

FIGURE 4 is an axial cross-section view of the novel storage unit.

Figure 1:
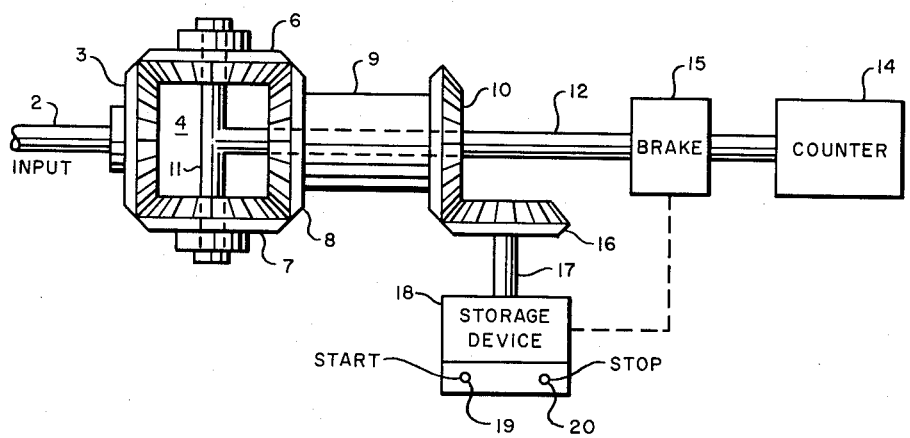
FIGURE 1 is a block diagram showing the novel storage device in its cooperative relationship with other components of a system.

In FIGURE 1 an input shaft 2 is drivingly connected to a bevel gear 3 which constitutes part of a differential drive 4. Bevel gear 3 meshes with and drives a pair of bevel gears 6 and 7 each of which meshes with a fourth bevel gear 8. Bevel gear 8 has a hub 9 which carries another bevel gear 10. Bevel gears 6 and 7 are journaled on opposite ends of cross shaft 11 which is drivingly connected to another shaft 12 which turns a counter 14.

A brake 15 is arranged adjacent shaft 12 and will prevent the rotation of shaft 12 when energized. When brake 15 is deenergized, shaft 12 will rotate whenever input shaft 2 is rotated thus causing counter 14 to operate and record the rotation of shaft 12. However, when brake 15 is energized the further rotation of shaft 12 is inhibited and upon the continued rotation of input shaft 2, gear 8 via hub 9 causes gear 10 to rotate. Gear 10 meshes and drives a bevel gear 16 which is connected by a shaft 17 to the novel storage device 18.

The entire system operates as follows. Brake 15 is normally off and counter 14 records the rotation of shaft 12. When a revision of the total in counter 14 is desired, a start-storage pushbutton 19 is depressed and brake 15 is energized. This stops the further rotation of shaft 12 and feeds the differential output through shaft 17 and bevel gears 10 and 16 to storage device 18.

Storage device 18 will accumulate and store the rotations of shaft 17 up to a predetermined maximum number of rotations whereupon brake 15 is automatically released and the exact number of rotations are delivered to counter 14 through shaft 17, gears 16 and 10, and the differential 4. Provision is made for stopping the storage prior to the maximum previously referred to. This is accomplished by depressing a stop-storage button 20 which causes the information in the storage device 18 to feed back as previously stated. The exact manner in which the above is accomplished will become obvious with the description of FIGURES 2 and 3 which follows.

Figure 2:
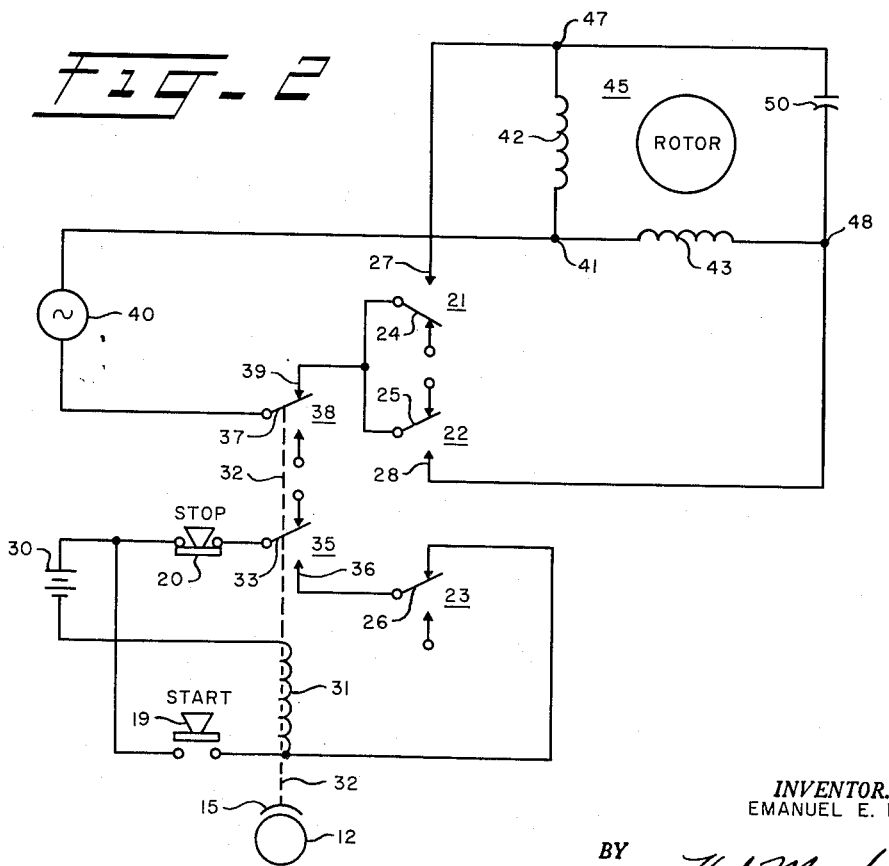
FIGURE 2 is a schematic diagram showing the electrical connections in the system of FIGURE 1.

FIGURE 2 as previously stated shows the switches and the electrical connections for implementing the entire system as shown in FIGURE 1. Three switches 21, 22 and 23 are intimately connected with storage device 18 and their armatures 24, 25 and 26, respectively, are actuated by the rotation of input shaft 17. Upon the initial rotation of shaft 17 either armature 24 or armature 25, depending upon the direction of rotation of shaft 17, will be caused to move from its zero or rest position illustrated in FIGURE 2 to engage contact 27 or 28 respectively. If the rotation is in one direction, armature 24 will engage contact 27 and armature 25 of switch 22 will remain static. If, however, the rotation is opposite, armature 25 will engage contact 28 and armature 24 of switch 21 will remain static. When start pushbutton 19 is depressed, current from a battery 30 passes through a solenoid winding 31 which actuates armature 32. Armature 32 moves brake shoe 15 which inhibits further movement of shaft 12. In addition, armature 32 displaces an armature 33 of switch 35 so that it engages switch contact 36. When armature 33 engages contact 36, current from battery 30 has a second path established through winding 31. This is necessary to hold the brake on since starting pushbutton 19 is of the momentary contact type.

In addition, armature 32 moves an armature 37 of a switch 38 from a contact 39. An alternating current supply 40 has one terminal connected to armature 37 and its other terminal to a terminal 41. Two field windings 42 and 43 of a motor 45 each have one end connected to terminal 41. The other end of winding 42 is connected to a terminal 47 which is connected to contact 27 of switch 21. The other end of winding 43 is connected to a terminal 48 which is connected to contact 28 of switch 22. A capacitor 50 joins terminals 47 and 48. All switches have been shown in their deenergized or normal condition.

When it is desired to stop the input to counter 14 and store the rotation of input shaft 2, start pushbutton 19 is depressed. This closes the circuit which includes solenoid winding 31 causing armature 32 to energize brake 15. At the same time the alternating current supply to motor 45 is interrupted by opening switch 38. Switch 35 is closed which establishes a current path for winding 31 through switches 20, 35 and 23. Thus armature 32 will remain actuated until switch 20 or 23 are opened. As soon as brake 15 is applied, shaft 17 of storage device 18 starts turning to follow input shaft 2. Depending on the rotation of input shaft 2, switches 21 or 22 will be closed to energize motor 45.

When the maximum predetermined count has been reached, switch 23 is automatically opened causing armature 32 to go back to its normal or deenergized position. This causes armature 37 to engage contact 39 which energizes motor 45. When motor 45 is energized, the rotor which is mechanically coupled to the storage device causes the storage device to rotate in the opposite direction thus delivering the stored angular displacement through differential 4 to counter 14. When the storage device reaches the zero or start position, switches 21 or 22, whichever has been displaced initially, will return to the position shown thus deenergizing motor 45 and causing storage device to come to rest at the zero position. The mechanical structure responsible for actuating switches 21, 22 and 23 is shown in detail in FIGURE 3 and will now be described.

Figure 3:
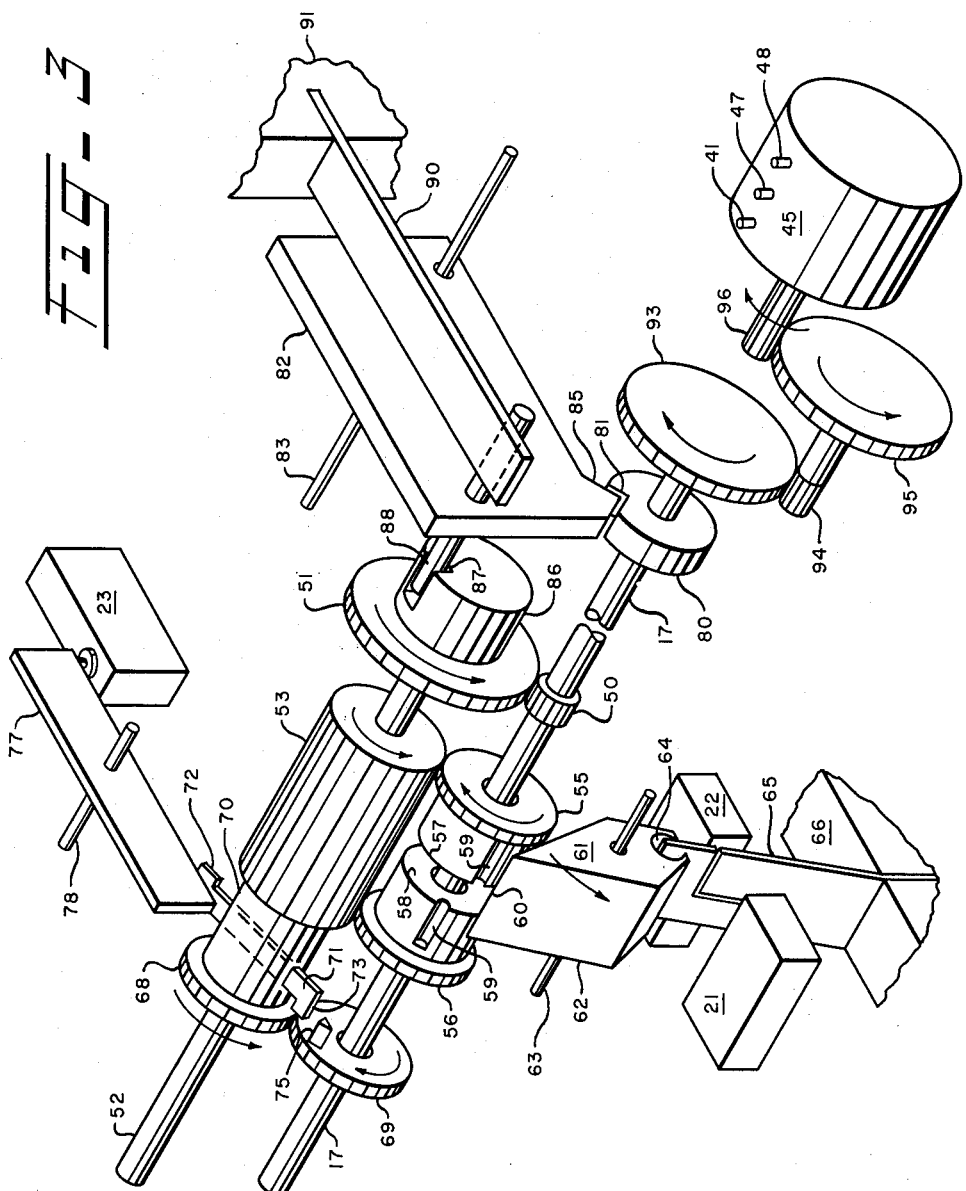
FIGURE 3 is an isometric drawing of the novel mechanical storage unit and includes in addition thereto the operating motor and the control switches.

In FIGURE 3 shaft 17 has a pinion gear 50 pressed thereon. Gear 50 turns with shaft 17 and meshes with and turns a gear 51 pressed on a counter shaft 52 which rotates at a much lower speed than input shaft 17. Another pinion gear 53 is pressed on shaft 52 and turns with it. Gear 53 meshes with and drives two dissimilar gears 55 and 56 mounted for free rotation on shaft 17.

The hubs 57 and 58 of gears 55 and 56, respectively, are identical in size and each has an axial groove 59 cut therein which extends from the free end of the hub and terminates before reaching the other end of the hub. A member 61 having an upper inverted V-shaped portion 62 is pivotally mounted on a stationary shaft 63 and a channel 64 in the lower portion of member 61 engages one end of a split spring 65 which has its other end anchored in a boss 66.

When storage mechanism 18 is in the zero position, the apex 60 of V-shaped portion 62 rests in axial grooves 59 and split spring 65 is undeflected. Thus the armatures of switches 21 and 22 are not actuated and are electrically connected as shown in FIGURE 2. However, when the input shaft 17 is rotated clockwise, as indicated by the direction arrows, gears 55 and 56 are also rotated clockwise, which causes the member 61 to be rotated counterclockwise. When this occurs split spring 65 is moved towards switch 22 and actuates armature 25 thus moving it from the position illustrated in FIGURE 2 so that it engages contact 28. If on the other hand input shaft 17 had been rotated counterclockwise, the directions of rotation would all have been reversed and split spring 65 would have been deflected toward switch 21 which would have actuated armature 24 causing it to engage contact 27.

Another pinion 68 pressed on countershaft 52 meshes with and drives a gear 69 mounted for free rotation on input shaft 17. Pinion gear 68 has a hub 70 which has a diametral passage therethrough. This passage is aligned with a similar passage through shaft 52 and a slidable member 71 is positioned in the passage formed by the aligned hub and shaft passages. Slidable member 71 has ears 72 and 73 extending laterally from its two ends which restrict its movement in the passage formed in hub 70 and shaft 52.

Gear 69 has a stud 75 projecting to one side. The stud extends circumferentially substantially the same distance as one tooth on gear 69 and projects only so far as to engage ear 73 of slidable member 71 which occurs only after a predetermined number of revolutions since the rotational speeds of gear 69 and shaft 52 differ.

A lever 77 is pivotally mounted on a fixed shaft 78 and has one end urged upwards whenever stud 75 and ear 73 engage. Whenever the one end is urged upward by ear 72 the other end actuates the armature 26 of switch 23 which opens the circuit including winding 31 which is shown in FIGURE 2.

A disc 80 with a V-shaped notch 81 in its periphery is pressed on shaft 17 and a lever 82 pivotally mounted on a fixed shaft 83 has a V-shaped detent 85 which mates with notch 81 to accurately position shaft 17 in the zero position and at the maximum limit. The hub 86 of gear 51 has a U-shaped axial groove 87 in its outer periphery and a stud 88 extending laterally from lever 82 nests therein to aid in accurately positioning the mechanism in the zero position by permitting detent 85 to engage notch 81 at the zero and limit positions only. A flat spring 90 anchored in a boss 91 urges stud 88, and the V-shaped detent into engagement with groove 87 and notch 81, respectively. It should be noted that when input shaft 17 is rotated stud 88 and detent 85 will rise against the pressure exerted by spring 90 to permit the mechanism to move. However, when the mechanism is returned to the zero position by motor 45 the mechanism will stop at its zero position since the motor is deenergized at that position and the force exerted by spring 90 will, in cooperation with stud 88 and detent 85, position the mechanism at its exact zero position. Input shaft 17 is connected to motor 45 by a gear train comprising gears 93, 94, 95 and gear teeth cut in the rotor shaft 96 of motor 45.

FIGURE 4 shows the very same structure shown and described in FIGURE 3. However, an axial cross-sectional view has been employed to illustrate the exact physical relationships of the various gears. These gears and other elements have been numbered with the same numbers employed in FIGURE 3. In addition, FIGURE 4 shows the bearings and bearing support elements which journal input shaft 17 and countershaft 52; the bearings and bearing supports which carry gears 94 and 95; and the support for motor 45.

In one embodiment of the invention which has been constructed and successfully operated, the following gears were used and with these gear ratios sixty-one turns were obtained before switch 23 was opened and the operation reversed.

| Gear | Teeth | Diametral Pitch |
| --- | --- | --- |
| 50 | 14 | 120 |
| 51 | 61 | 120 |
| 53 | 33 | 120 |
| 55 | 44 | 120 |
| 56 | 42 | 120 |
| 68 | 29 | 96 |
| 69 | 28 | 96 |
| 93 | 61 | 120 |
| 94 | 13 | 120 |
| 95 | 61 | 120 |

It should be obvious that the number of teeth employed in the various gears may be altered so that a different number of turns will be achieved between the zero position of the mechanism and the actuation of switch 23. The only requirement that must be observed is that gears 55 and 56 must have a different number of teeth so that switches 21 or 22 will remain actuated until such time as the mechanism is returned by motor 45 to its zero position. Otherwise the gear ratios may be manipulated to provide a wide variety of storage.

With only one embodiment of the invention has been shown and described in detail for illustration purposes, it is to be expressly understood that the invention is not to be limited to this specific embodiment shown.

What is claimed is:

1. A motion storage device comprising, an input shaft with a first pinion gear drivingly connected thereto, a countershaft driven by a gear meshing with said pinion gear on the input shaft, a second pinion gear drivingly mounted on said countershaft, first and second dissimilar gears mounted for rotation and arranged to engage and be driven by said second pinion gear, means for engaging said two dissimilar gears for positionally indicating the direction of rotation of said gears when the input shaft is rotated, a third pinion gear drivingly mounted for rotation on said countershaft, a third gear mounted for rotation and arranged to engage and be driven by said third pinion gear, means mounted for rotation on said third gear, displaceable means for indicating a predetermined number of rotations of said input shaft when displaced from a first position to a second position, and movable means mounted for rotation by said countershaft for simultaneously engaging said means mounted for rotation on the third gear and the displaceable means after a predetermined number of rotations of said input shaft to move said displaceable means from its said first position to its said second position for indicating that the said input shaft has completed the predetermined number of rotations.

2. A motion storage device as set forth in claim 1 in which the means for engaging said two dissimilar gears for positionally indicating the direction of rotation of said gears when said input shaft is rotated comprises, first and second identical hubs attached to and driven by said first and second dissimilar gears, respectively, each of said hubs having an axially extending groove in its outer circular periphery, and pivotally mounted means arranged to be positioned in both of said grooves when the storage device is in the zero position.

3. A motion storage device comprising, an input shaft with a first pinion gear drivingly connected thereto, a countershaft driven by a gear meshing with said pinion gear on the input shaft, a second pinion gear drivingly mounted on said countershaft, first and second dissimilar gears mounted for free rotation on said input shaft and arranged to engage and be driven by said second pinion, means for engaging said two dissimilar gears for positionally indicating the direction of rotation of said gears when the input shaft is rotated, a third pinion gear drivingly mounted for rotation on said countershaft, a third gear mounted for free rotation on said input shaft and arranged to engage and be driven by said third pinion, means mounted for rotation with said third gear, displaceable means for indicating a predetermined number of rotations of said input shaft when displaced from a first position to a second position, and movable means mounted for rotation by said countershaft for simultaneously engaging said means mounted for rotation on the third gear and the displaceable means after a predetermined number of rotations of said input shaft to move said displaceable means from its said first position to its said second position for indicating that the said input shaft has completed the predetermined number of rotations.

4. A motion storage device as set forth in claim 3 in which the means for engaging said two dissimilar gears for positionally indicating the direction of rotation of said gears when said input shaft is rotated comprises, first and second identical hubs attached to and driven by said first and second dissimilar gears, respectively, each of said hubs having an axially extending groove in its outer circular periphery, and pivotally mounted means arranged to be positioned in both of said grooves when the storage device is in the zero position.

5. A motion storage device comprising, an input shaft with a first pinion gear drivingly connected thereto, a countershaft driven by a gear meshing with said pinion gear on the input shaft, a second pinion gear drivingly mounted on said countershaft, first and second dissimilar gears mounted for free rotation on said input shaft and arranged to engage and be driven by said second pinion, means for engaging said dissimilar gears and for positionally indicating the direction of rotation of said gears when the input shaft is rotated, a third pinion gear drivingly mounted for rotation on said countershaft, a third gear mounted for free rotation on said input shaft and arranged to engage and be driven by said third pinion, means carried by said third gear, displaceable means for indicating a predetermined number of rotations of said input shaft when displaced from a first position to a second position, movable means carried by said countershaft for simultaneously engaging said means carried by said third gear and the displaceable means after a predetermined number of rotations of said input shaft whereby said displaceable means is moved from the first position to the second position, and biasing means for centering said storage device at its exact zero position.

6. A motion storage device as set forth in claim 5 in which the means for engaging said two dissimilar gears for positionally indicating the direction of rotation of said gears when said input shaft is rotated comprises, first and second identical hubs attached to and driven by said first and second dissimilar gears, respectively, each of said hubs having an axially extending groove in its outer circular periphery, and pivotally mounted means arranged to be positioned in both of said grooves when the storage device is in the zero position.

7. A motion storage device as set forth in claim 6 in which the biasing means for centering said device at the exact zero position comprises, a notched disc mounted on said input shaft, and a spring loaded detent urged against the periphery of said notched disc.

References Cited in the file of this patent
UNITED STATES PATENTS

| | | |
|---|---|---|
| 2,519,907 | Hodgson | Aug. 22, 1950 |
| 2,722,379 | Hayek | Nov. 1, 1955 |
| 2,746,318 | Benjamin | May 22, 1956 |